(12) United States Patent
Seifert et al.

(10) Patent No.: US 6,505,170 B1
(45) Date of Patent: *Jan. 7, 2003

(54) DISTRIBUTED DEVICE MANAGEMENT SYSTEM

(75) Inventors: Dean Alan Seifert, Aurora, CO (US); Earney Stoutenburg, Highlands Ranch, CO (US); Paul J. Vogt, Highlands Ranch, CO (US)

(73) Assignee: Western Union North America, Englewood, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/833,849

(22) Filed: Apr. 10, 1997

Related U.S. Application Data

(63) Continuation-in-part of application No. 08/726,133, filed on Oct. 4, 1996.

(51) Int. Cl.[7] .............................................. G06F 17/60
(52) U.S. Cl. ............................. 705/21; 705/16; 705/24; 235/379; 713/170; 713/173; 713/175
(58) Field of Search ............................ 705/18, 21, 16; 380/24, 25, 49; 395/712, 183.01, 183.22; 340/825.26, 825.31, 825.36; 235/379

(56) References Cited

U.S. PATENT DOCUMENTS

| | | | | |
|---|---|---|---|---|
| 4,033,442 A | * | 7/1977 | Wirstlin et al. .............. 194/225 |
| 4,412,292 A | * | 10/1983 | Sedam et al. ........... 364/479.11 |
| 4,432,050 A | * | 2/1984 | Harris et al. ................. 395/712 |
| 4,468,750 A | * | 8/1984 | Chamoff et al. ............... 501/10 |
| 4,598,379 A | * | 7/1986 | Awane et al. ................ 364/479 |
| 4,884,671 A | * | 12/1989 | Gardellini .................... 194/207 |
| 4,888,683 A | * | 12/1989 | Koizumi et al. ............. 395/712 |
| 5,023,782 A | * | 6/1991 | Lutz et al. ...................... 705/45 |
| 5,119,293 A | * | 6/1992 | Hammond .................... 705/24 |
| 5,119,294 A | * | 6/1992 | Tanaka .......................... 705/21 |
| 5,243,174 A | | 9/1993 | Veeneman et al. |
| 5,255,182 A | * | 10/1993 | Adams .......................... 705/17 |
| 5,274,368 A | * | 12/1993 | Breeden ................ 340/825.31 |
| 5,282,127 A | * | 1/1994 | Mii ................................ 700/1 |
| 5,377,271 A | | 12/1994 | Foreman et al. |
| 5,477,037 A | * | 12/1995 | Berger .......................... 235/79 |
| 5,479,479 A | * | 12/1995 | Raiberg et al. .............. 455/404 |
| 5,500,890 A | * | 3/1996 | Rogge et al. ............. 379/91.02 |
| 5,526,409 A | * | 6/1996 | Onrow et al. ............. 379/91.02 |
| 5,608,643 A | * | 3/1997 | Wichter et al. ............. 700/244 |
| 5,631,907 A | | 5/1997 | Guarneri et al. |
| 5,663,887 A | * | 9/1997 | Warn et al. ............. 364/479.02 |
| 5,678,937 A | * | 10/1997 | Smith .......................... 400/78 |
| 5,742,845 A | * | 4/1998 | Wagner ...................... 395/831 |
| 5,768,495 A | * | 6/1998 | Campbell ..................... 714/25 |
| 5,787,288 A | * | 7/1998 | Negata et al. .............. 395/712 |
| 5,790,796 A | * | 8/1998 | Sadowsky .............. 395/200.51 |
| 5,984,364 A | * | 11/1999 | Diamond ..................... 283/67 |
| 5,997,928 A | * | 12/1999 | Kaish et al. ................. 426/418 |
| 6,015,087 A | * | 1/2000 | Seifert et al. ................ 235/379 |
| 6,293,469 B1 | * | 9/2001 | Masson et al. ............. 235/476 |

FOREIGN PATENT DOCUMENTS

| | | |
|---|---|---|
| EP | 0029733 A2 * | 3/1981 |
| WO | WO 95/03570 | 2/1995 |

OTHER PUBLICATIONS

"Best Practices and technologies for Automated Software Distribution Best Practices Report"; Open Systems Research Group; 14 pages, Jan. 1, 1995.*

(List continued on next page.)

*Primary Examiner*—Tariq R. Hafiz
*Assistant Examiner*—Romain Jeanty
(74) *Attorney, Agent, or Firm*—Bingham McCutchen, LLP; David G. Beck

(57) ABSTRACT

A distributed device management system. The system includes a set of distributed devices, such as point-of-sale devices. The devices are managed by a remote host.

26 Claims, 11 Drawing Sheets

OTHER PUBLICATIONS

"Software Buyers' Guide (Buyers Guide)", Purchasing; v118 n8, p. 59(6); Dialogue: File 148, Account# 07895159, May 18, 1995.*

"Software Distribution: Cost or Economy?"; ADT Data Services; 8 pages, Feb. 1, 1996.*

"Money Order Dispensing Boost Security", May 14, 1986, American Banker, vol. 151, No. 95, Dialog file 625, Accession No. 0052059.*

Tanner, Ronald, "A New Dimension in Marketing," *Computer Usage for Profits*, May, 1987, pp. 133–134, 136.

"Ukrop's Tests Data Base Marketing Program; Electronic Couponing Tracts Buying Behavior of Valued Customers, *Chair Store Age Executive*," Sep. 1987, pp. 73–74, 78.

International Search Report, International Application No. PCT/US97/17706 (Corresponding U.S. Patent Application 08/726,133), Apr. 23, 1998.

* cited by examiner

DISTRIBUTED DEVICE MANAGEMENT SYSTEM

This application is a continuation-in-part of co-pending application Ser. No. 08/726,133, filed Oct. 4, 1996.

FIELD OF THE INVENTION

The present invention relates to point-of-sale devices and, more particularly, to management of a distributed system of point-of-sale devices.

BACKGROUND OF THE INVENTION

The use of point-of-sale devices to conduct transactions is becoming increasingly widespread. Point-of-sale devices can be placed at a wide variety of convenient locations (e.g., grocery stores, convenience stores), allowing customers to conveniently purchase certain goods or services without the need to visit an outlet dedicated to selling the relevant goods or services. For example, point-of-sale devices often are used to sell negotiable instruments or to permit payment of utility bills at locations convenient to the customer. Such devices may even be placed in homes and businesses.

A wide variety of point-of-sale devices currently are available, offering a wide array of products and services. Point-of-sale devices may, for example, be used to sell money orders or other products. They may also be used to permit payment of bills or any other type of transaction service.

Negotiable instrument dispensers, such as money order dispensing machines, provide an instructive example of the use of point-of-sale devices. Money order dispensing machines ("MODs"), which are also referred to by various names such as "automatic money order dispensers" or "AMODs," or "RMODs" or "Deltas," allow for the issuance and sale of money orders at a wide variety of convenient locations. MODs commonly are placed at convenience stores, check cashing agencies, grocery stores, financial institutions, and other retail and service outlets. The "issuer" of the money orders generally authorizes an "agent" (e.g., the grocery store) to operate the MOD at each location. When a MOD is installed at a particular site, and periodically thereafter, blank money order forms (which are negotiable documents and are sometimes referred to as "negotiable stock") are loaded into a compartment within the MOD. As customers purchase money orders, the operator enters appropriate information (e.g., amount), and the MOD prints the information on the forms and dispenses the completed money orders. The forms are typically numbered sequentially. When the MOD is loaded, the operator loading the forms enters the serial numbers of the first forms. As money orders are purchased, the MOD increments a counter to keep track of which forms have been printed on. The MODs also provide reports of MOD activity, either electronically or in printed form.

The owner of a system of point-of-sale devices (e.g., the issuer of money orders) generally must closely manage its point-of-sale devices (e.g., MODs). For example, point-of-sale devices typically include a number of mechanical components and, therefore, commonly malfunction. The owner generally desires to keep the devices operative and, therefore, must monitor, maintain, and repair devices regularly. Additionally, devices such as MODs contain negotiable documents that may be used to impose financial liabilities on the issuer. The owner therefore needs to prevent fraudulent or unauthorized use of the devices.

To facilitate management of a widespread system of point-of-sale devices, the devices should have certain features. Several key features are discussed below.

Point-of-sale devices should be user-friendly. The individuals operating the devices (e.g., clerks at a convenience store) typically have little or no technical training, and it is often not practical for an issuer to provide training to each individual who will operate a device. Unfortunately, many conventional point-of-sale devices are not sufficiently easy to use. For example, it is often difficult to properly reload MODs with negotiable stock. Conventional MODs are also often bulky and difficult to install at agent sites.

Point-of-sale devices should also incorporate security features to prevent unauthorized usage and minimize the risk of misuse (e.g. the risk that fraudulent money orders will be created). Most conventional point-of-sale devices incorporate relatively primitive and limited security measures. For example, the compartment in a MOD containing the blank negotiable documents generally is locked, and may be opened only with a physical key. This security measure can prevent some types of unauthorized access, but permits free access to anyone who has obtained the key. It also does not provide any record of who accessed the negotiable documents and what activity took place during such access. Consequently, it is often difficult to determine in a timely manner whether documents have been removed, whether misuse may have occurred, and by whom.

Point-of-sale devices should also provide a mechanism with which the issuer can monitor usage of the device. Most conventional devices do not provide a mechanism for easy monitoring and rely on information supplied to the issuer or the device itself by the user. For example, conventional MODs generally do not verify the sequence of the items during the sales process, instead relying on the initial number entered by the operator as described above. In the event the documents become out of sequence (e.g., due to a jam, operator errors, or theft), the MOD records the expected serial number without verification of the appropriate document on which it is printing. Some MODs employ a primitive sequence verification technique in which every third document contains an identical, detectable mark (i.e., a sequencing mark). When the MOD detects a sequencing mark, it determines whether the document counter number is divisible by three and, if so, assumes that the documents are in sequence. This technique, however, is inadequate in that it does not detect all types of sequence errors. For example, if three consecutive documents were removed from the sequence, the system would not detect the problem. Additionally, prior art point-of-sale devices may require the issuer to physically inspect the device to obtain many types of information. Conducting routine physical inspections can be costly and time consuming.

With the passage of time, systems of point-of-sale devices are being installed with increasingly large numbers of devices. Additionally, the functions performed by typical devices are increasing in complexity. These trends increase the need for user-friendly and efficient management from a remote location. In general, the larger and more complex the system, the more user-friendly it must be if relatively untrained users are involved.

Accordingly, there is a need for an improved system for managing a distributed system of devices that provides advantages over prior systems.

SUMMARY OF THE INVENTION

The present invention provides an improved system for management of distributed point of sale devices. Embodiments of the present invention can provide more convenient, secure and efficient means for managing distributed devices.

The present invention allows for embodiments having many advantages, such as the following:

(i) They permit efficient management of many point-of-sale devices.

(ii) They offer enhanced security measures.

(iii) They allow for an audit trail that accounts for every document placed in the printer of a point-of-sale device.

(iv) They allow for easy loading of the device and facilitate the determination of what was loaded.

(v) They are user friendly.

(vi) They provide secure storage of documents such as money orders.

(vii) They permit reduced manual record keeping and paperwork.

(viii) They provide a daily print-out of all transactions.

(ix) They provide quick and efficient printing of documents such as money orders.

(x) They permit the use of standard bar-code, MICR and/or OCR technology.

(xi) They provide an audit trail of who accessed the printer of a point-of-sale device and when.

Many additional advantages of the present invention will become apparent to those skilled in the art based on the present disclosure.

BRIEF DESCRIPTION OF THE DRAWINGS

A complete understanding of the present invention may be gained by considering the following detailed description in conjunction with the accompanying drawing(s), in which:

FIG. 6 is a flow chart showing an exemplary download notification and callback procedure according to the present invention.

DESCRIPTION OF PREFERRED EMBODIMENTS

In preferred embodiments of the present invention, a host manages a system of distributed point-of-sale devices. The host communicates with the devices over a communication network, such as a proprietary computer network, an open network such as the Internet, or a telephone network. For purposes of the present invention, the point-of-sale device may be any type of point-of-sale device providing any type of services or goods. For exemplary purposes only, MODs are described herein to illustrate many features of the present invention.

Exemplary System

Figure 1:
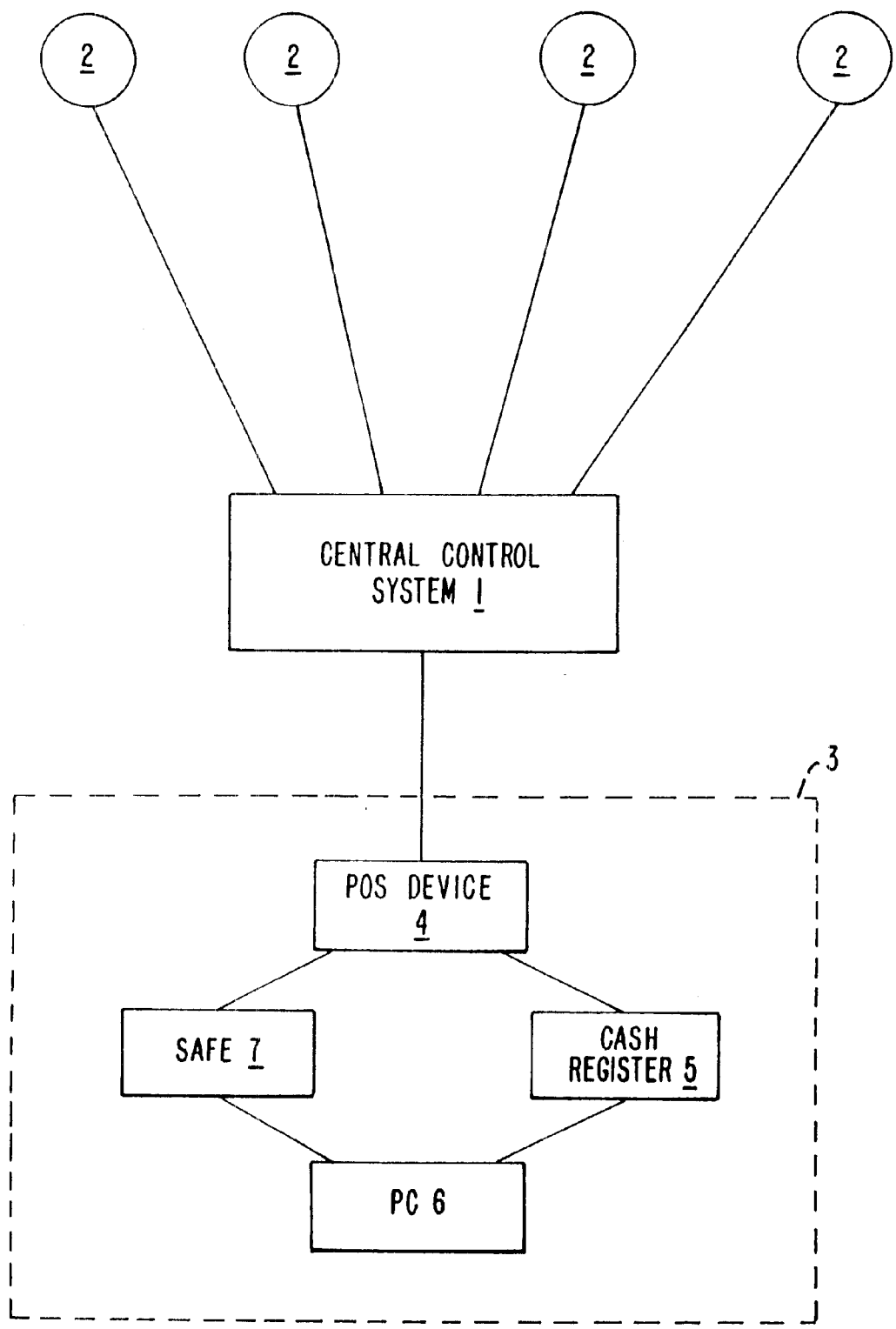
FIG. 1 shows one embodiment of a distributed system of point of sale devices for use with the present invention.

An exemplary system of point-of-sale ("POS") devices according to the present invention is shown in FIG. 1. The system of point-of-sale devices is managed by Central Control System 1, which may consist of one or more "host" computers. Central Control System 1 manages a plurality of POS systems 2, each of which includes a POS device. Four POS devices are shown for exemplary purposes only; it will be understood that the present invention encompasses embodiments having any number of POS devices.

Each POS system may optionally include other devices that communicate with the POS device over a local area network (or "LAN"). One such type of POS system is shown at 3 in FIG. 1. POS System 3 is managed, along with POS Systems 2, by Central Control System 1. POS System 3 includes a POS Device 4, a Cash Register 5, a personal computer ("PC") 6, and an electronically controlled safe 7, all of which are connected by a LAN. An operator uses Cash Register 5 and/or an alternative conventional control terminal to operate POS Device 4.

In many embodiments of the present invention, at least one POS device is a negotiable instrument dispenser. In many of such embodiments, an operator uses a control terminal to operate a document dispenser (preferably, a negotiable instrument dispenser,) which provides a more convenient, secure, user-friendly, and efficient means for loading, selling and reporting information relating to negotiable documents. The control terminal is connected to a printer/vault housing negotiable stock, signaling to print a money order and to unlock the vault as necessary. Blank money order forms are packaged in pre-defined bundles with serial numbers printed in a bar code format (MICR, OCR or other encoding techniques may be used), and are stored in the vault unit of the printer. The control terminal keeps track of which forms have been printed on and other usage information. The activity of the negotiable instrument dispenser is automatically recorded by the control terminal in an electronic "journal" (i.e., in memory) and periodically reported to a central computer.

Exemplary MOD

Figure 2:
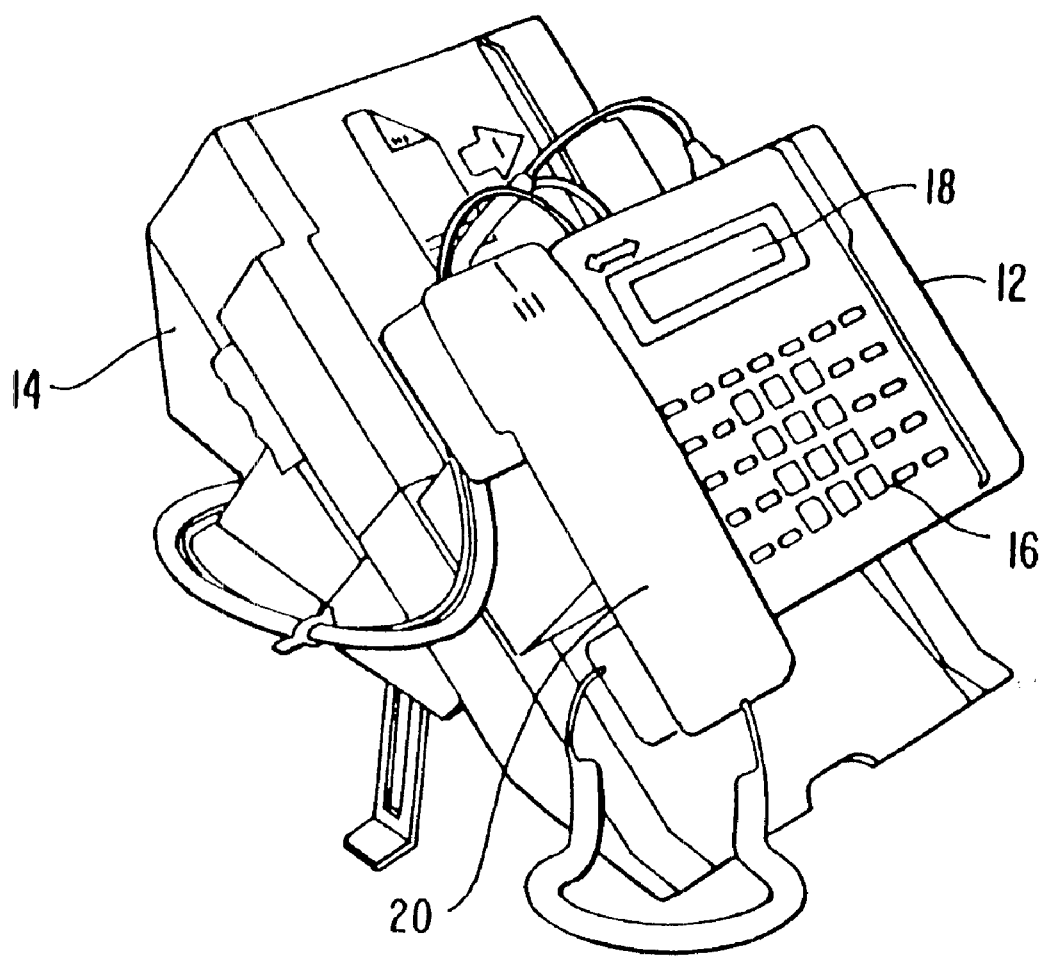
FIG. 2 shows one embodiment of a negotiable instrument dispenser for use according to the present invention.
Figure 3A:
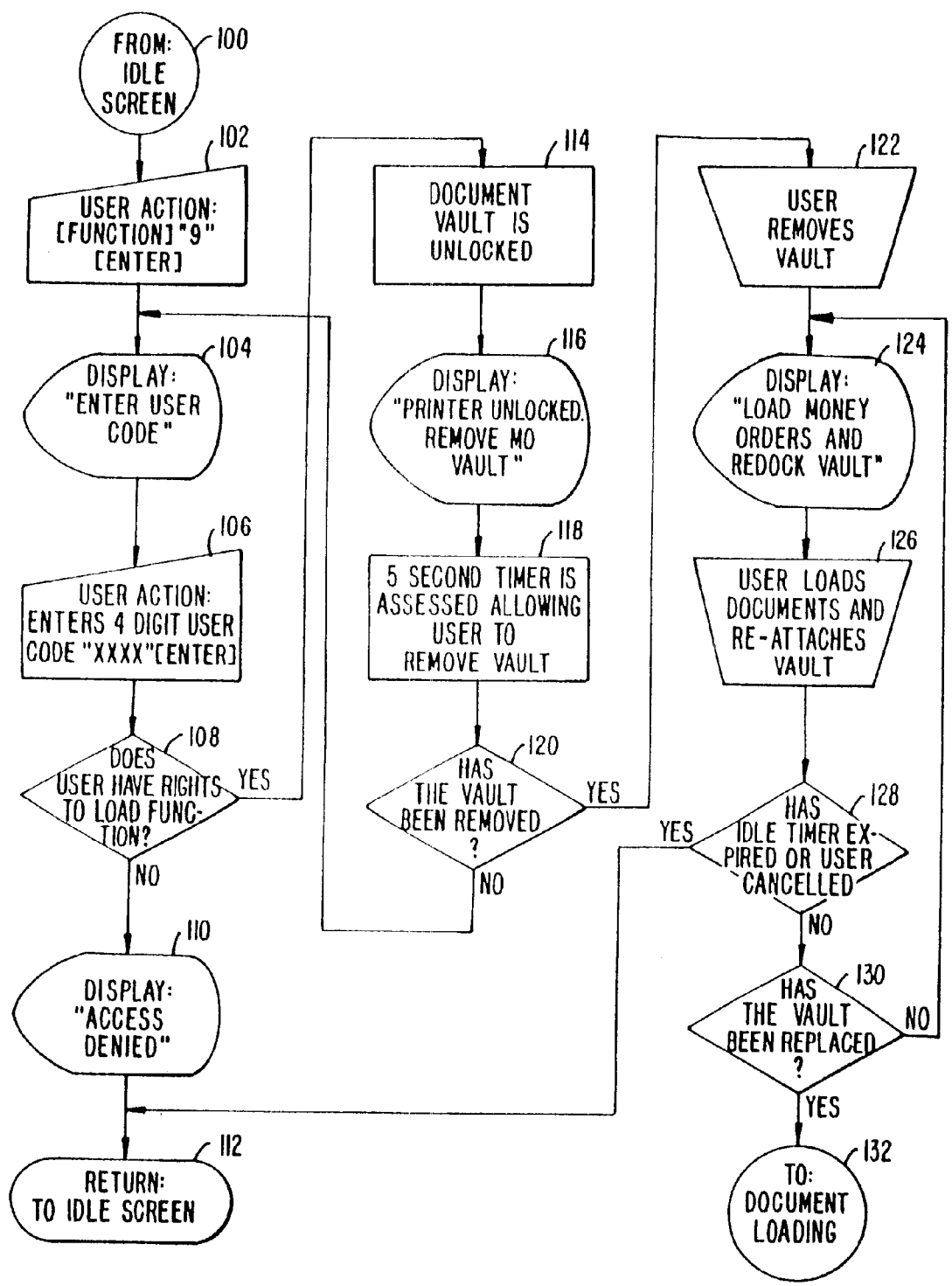
FIGS. 3(a), 3(b), 3(c) and 3(d) are a flow chart illustrating an exemplary document loading process for a negotiable instrument dispenser according to the present invention.
Figure 3B:
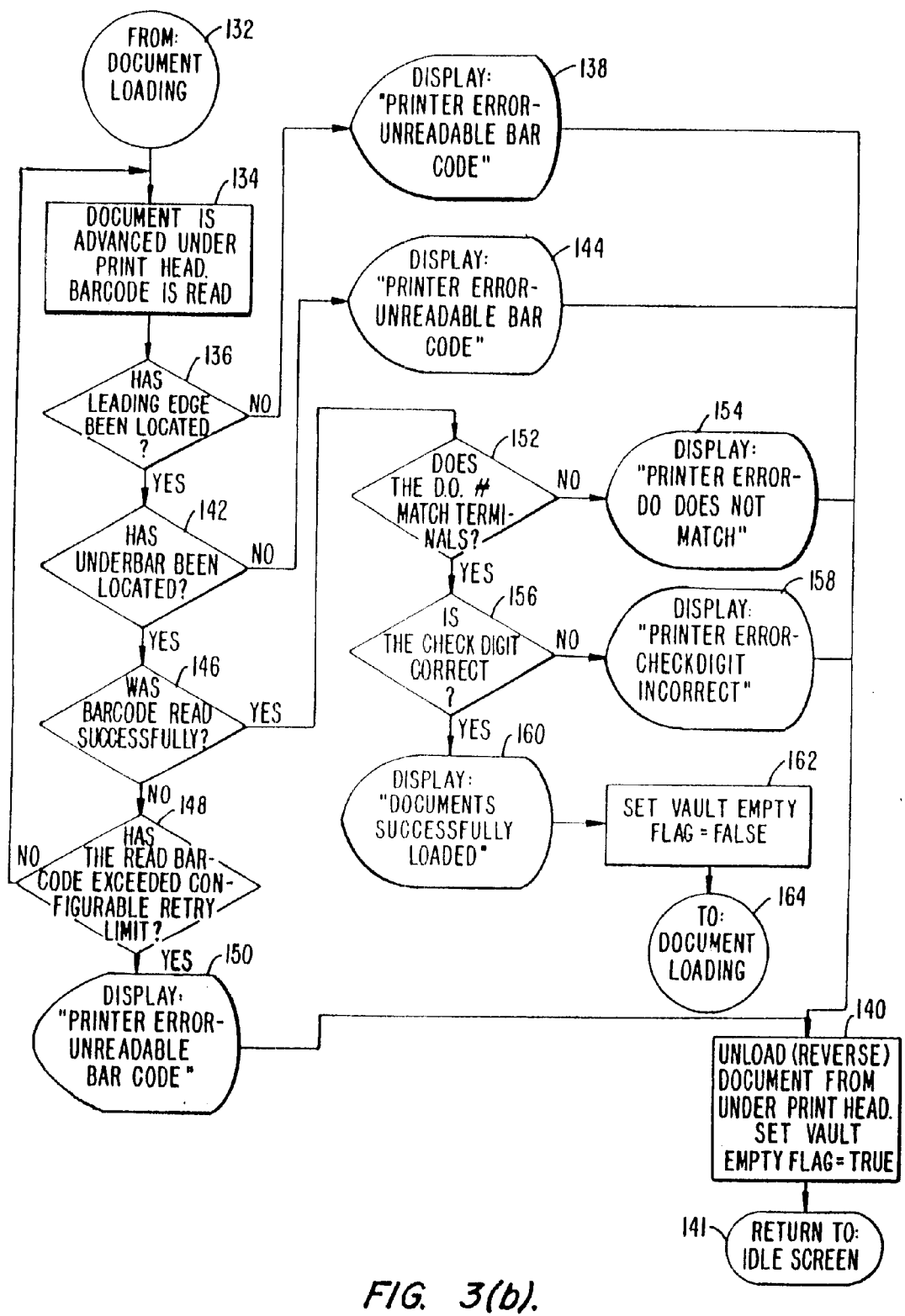
Figure 3C:
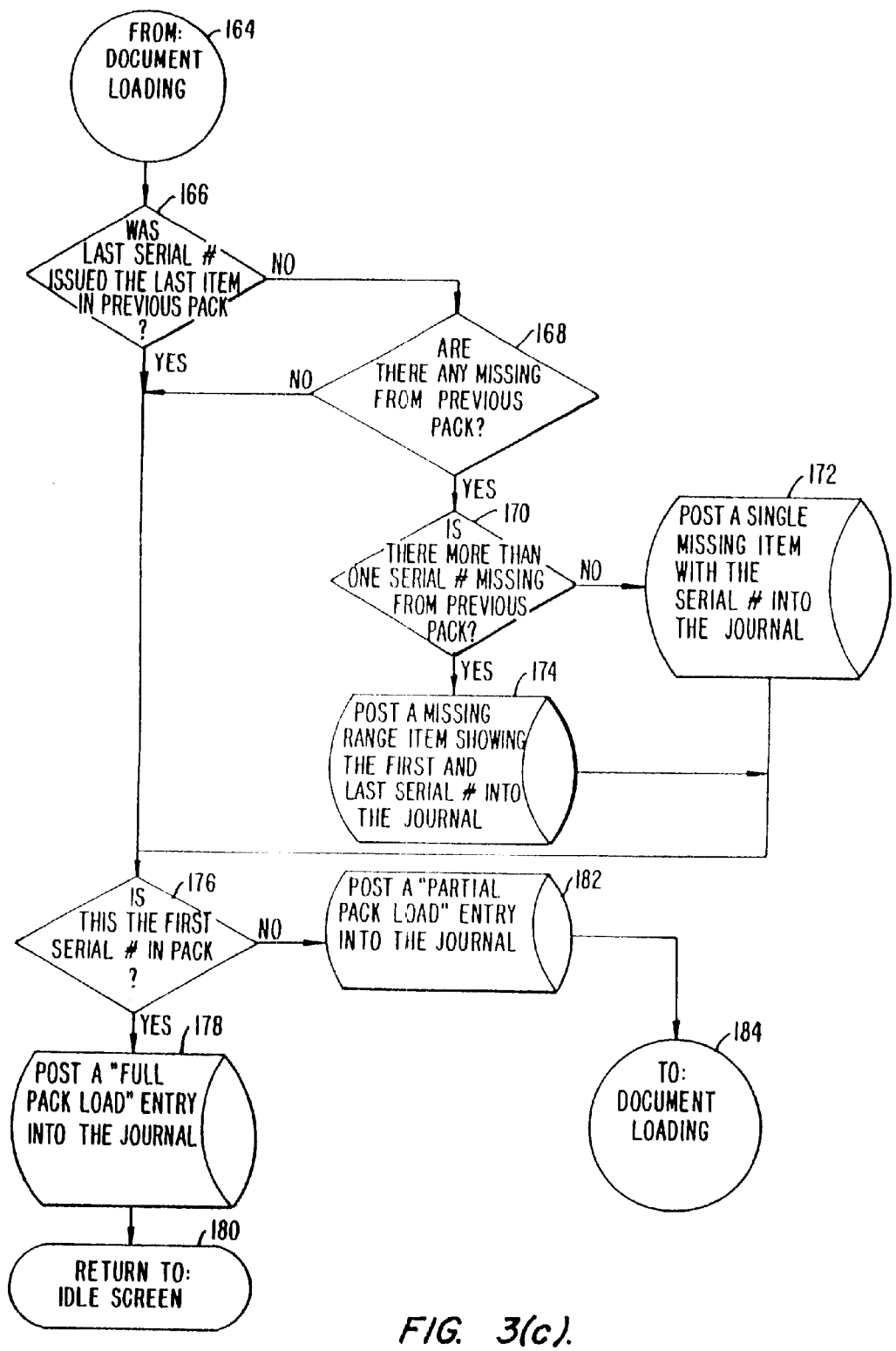
Figure 3D:
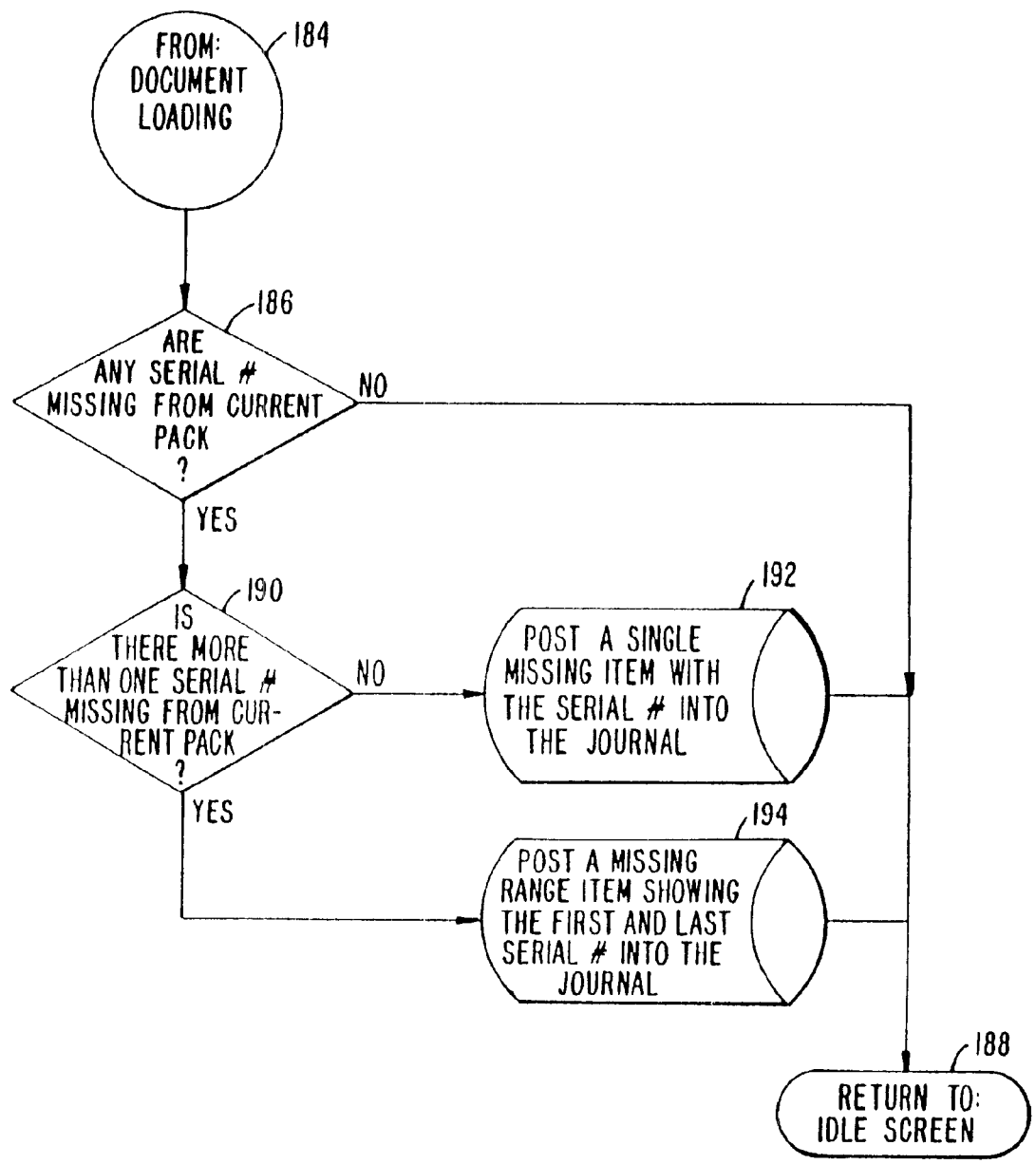
Figure 4A:
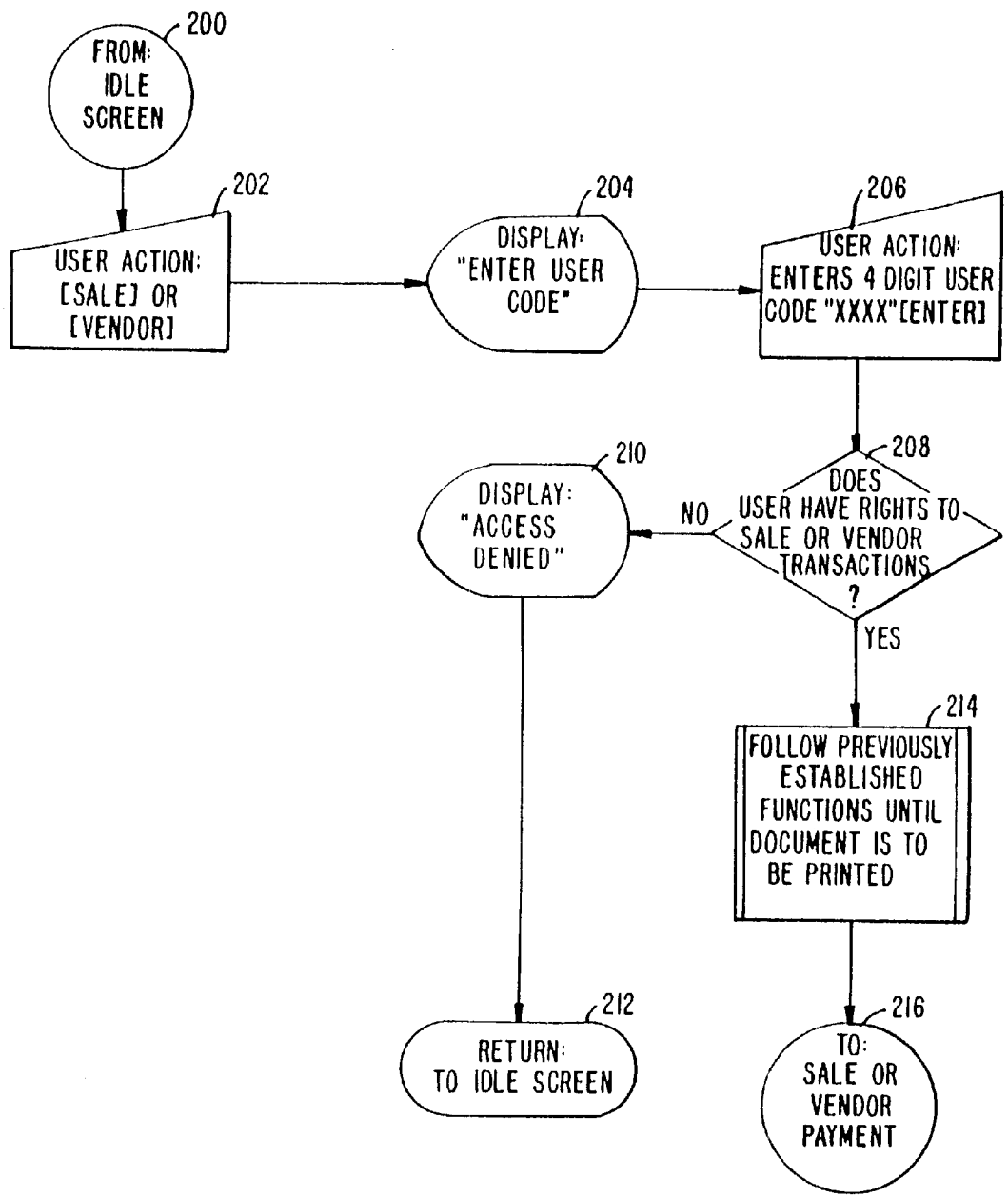
FIGS. 4(a), 4(b), 4(c) and 4(d) are a flow chart illustrating an exemplary process for a sale or vendor payment using a negotiable instrument dispenser according to the present invention.
Figure 4B:
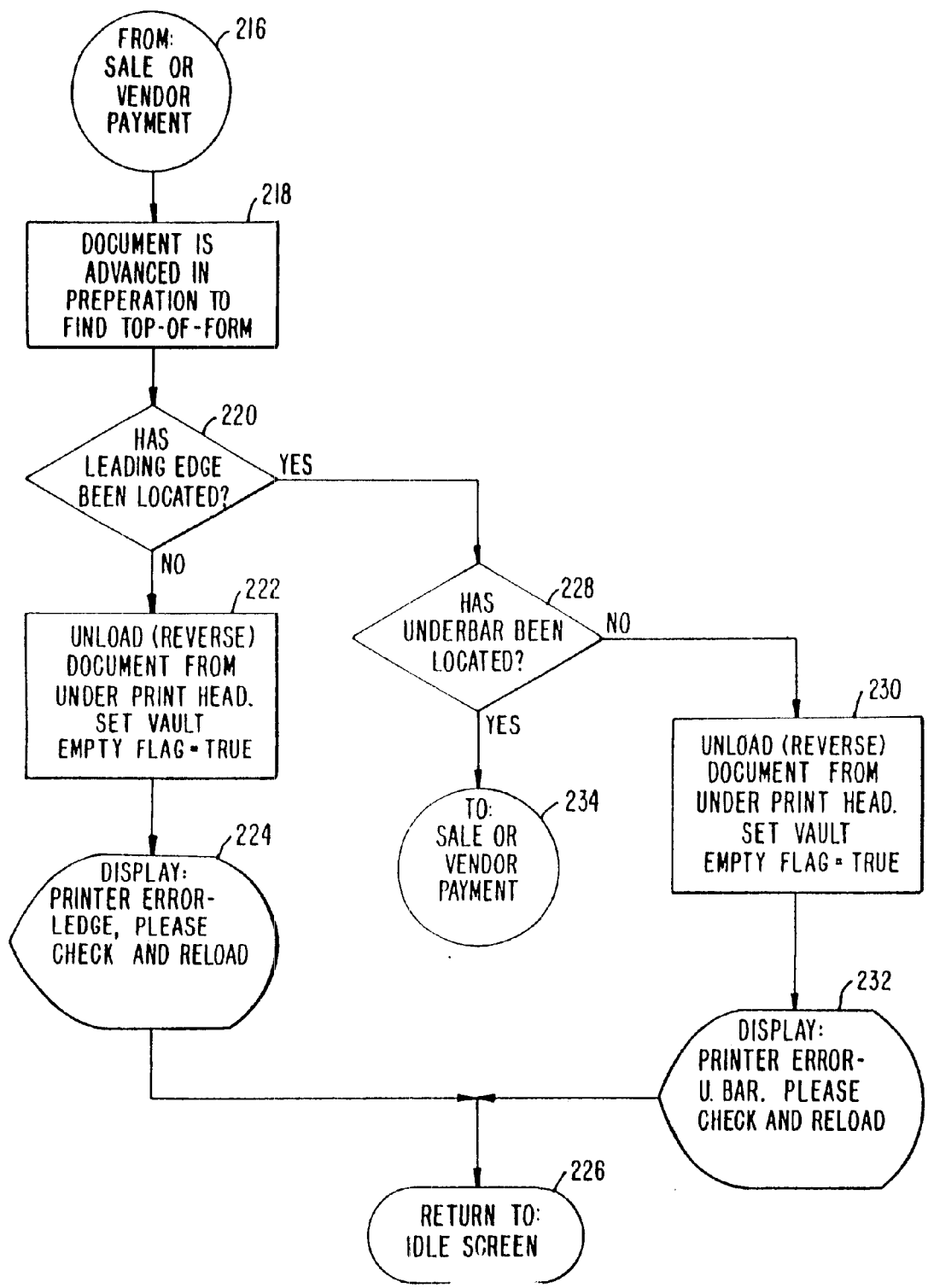
Figure 4C:
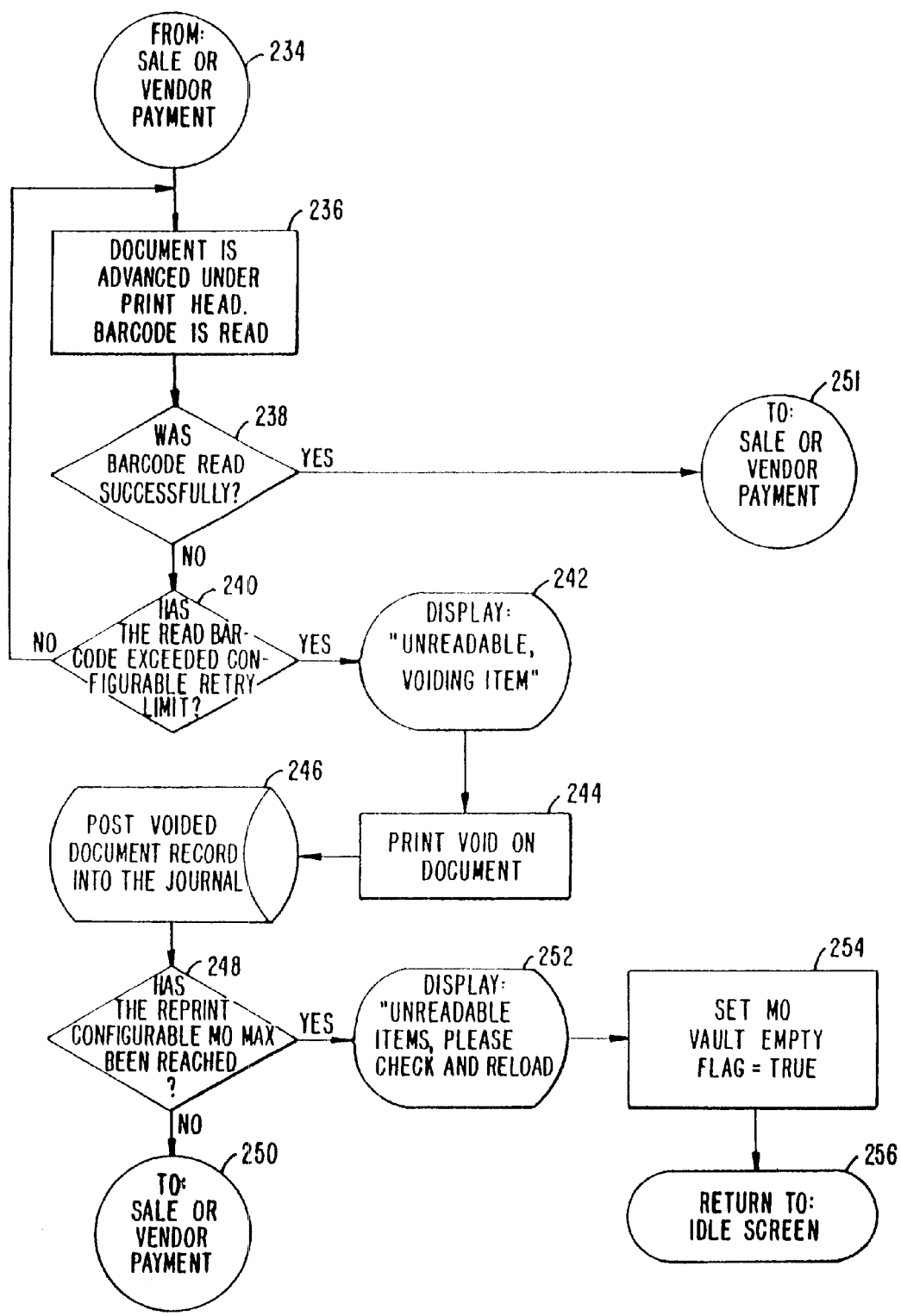
Figure 4D:
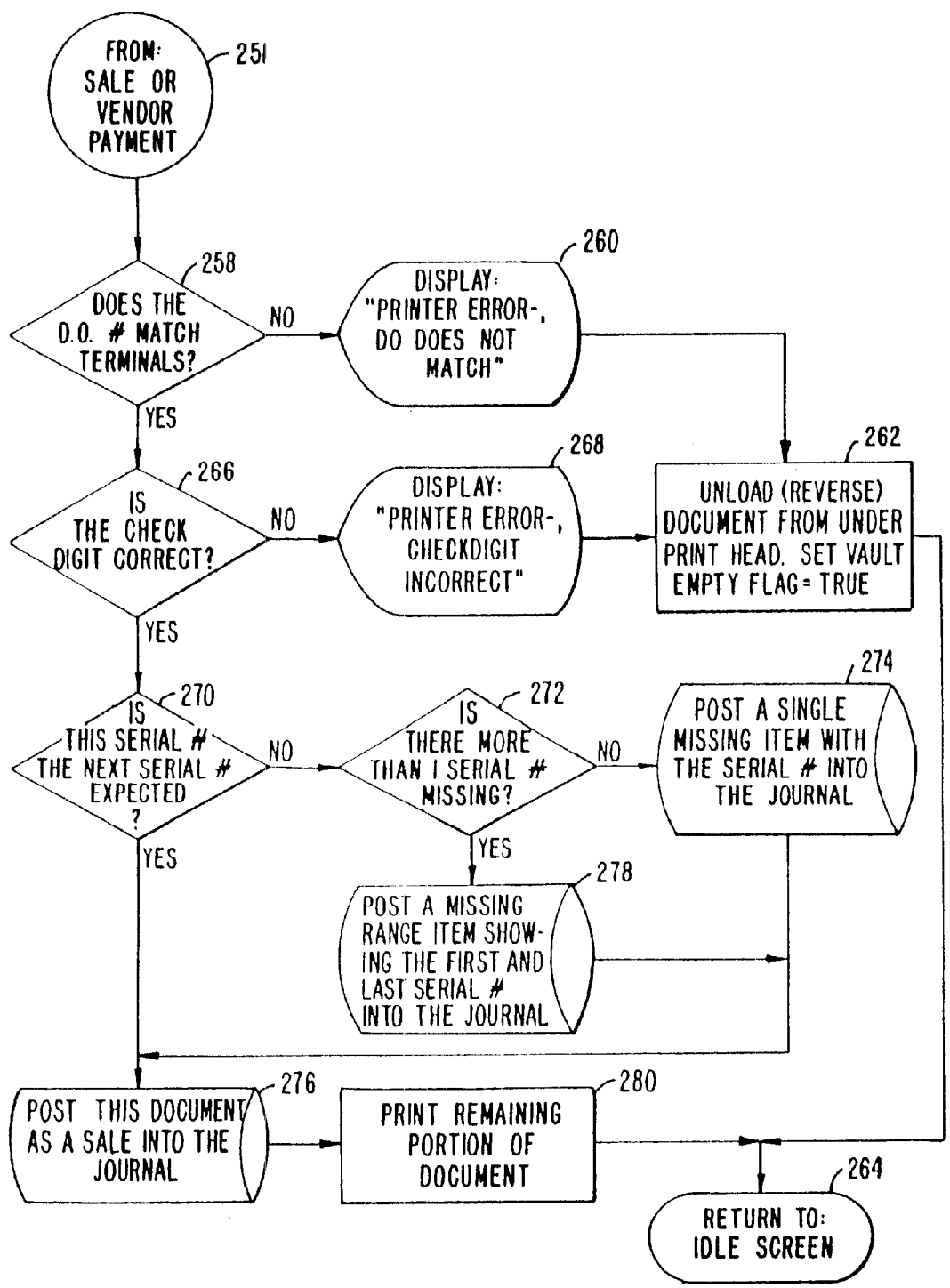

An exemplary automatic money order dispenser ("MOD") 10 for use with some embodiments of the present invention is shown in FIG. 2. MOD 10 consists of two separate parts: a control terminal 12 and printer/vault 14. Installation at an agent/user site simply involves connecting these two parts together, and then connecting them (via a port in the control terminal) to a telephone line to permit data transfer, and to an electrical outlet for power.

Control terminal 12 has three main functions: (1) to communicate with the issuer's central computer (i.e., the host system); (2) to control printer/vault 14 in accordance with pre-defined rules and user instructions; and (3) to control all other system activity (e.g., local fee calculation, security configurations, parameter settings.) From the standpoint of a user, it consists of a keypad 16, a display 18, and an optional telephone handset 20. MOD 10 uses ordinary phone lines to transmit activity to the central computer for quick and efficient record keeping. Control terminal 12 also records in its memory a "journal" or activity log, which keeps track of its usage information as described further herein.

Control terminal 12 keeps track of all transactions until it automatically "uploads" that information to the host computer at the issuer's central control facility at the end of each business day or at various times throughout the day. The transaction information preferably is stored in an internal nonvolatile memory (which may be implemented by either a volatile memory with a battery backup or a conventional nonvolatile memory). The control terminal also includes conventional programmable processor hardware so that it can be programmed to perform the processes described herein.

An operator uses keypad 16 on control terminal 12 to initiate any transactions with MOD 10. The steps that must be performed for each transaction are relatively simple. Instructions on performing all transactions preferably are described in a user guide provided to the agent.

The operator enters commands by pressing keys on keypad 16. Preferably, keypad 16 has three types of keys:

(1) Function Keys. These keys are used to initiate the type of transaction desired (e.g., sales, void, report, cancel).

(2) Numeric Keys. "0" through "9" are numeric keys. A user presses these when the needs to enter an amount or code.

(3) Alphanumeric Keys. These keys are used to enter text information and may be used in connection with transactions such as vendor payment. Keypad 16 can be implemented by those skilled in the art using any conventional keypad technology, including for example softkeys.

Display 18 provides users with important information and prompts users through the steps of each procedure. Display 18 can be implemented by those skilled in the art using alphanumeric display technology.

Display 18 is usually at the "status screen." This is the starting point of all functions available on the terminal. If the display screen shows a different message before a user begins a transaction, or a user becomes confused midway through a transaction, he or she simply presses "CANCEL" to return to this status screen. The status screen displays the current date and time, along with the number of documents in the printer and the number of transactions in the current day's files for various products applications in same terminal (e.g., money orders, utility remittance, phone card, payroll and gift certificates).

Printer/vault 14 preferably comprises a printer portion that contains a conventional MOD printer and a vault portion locked to the printer portion. The blank money order forms are stored in the vault portion of printer/vault 14. Printer/vault 14 is activated by control terminal 12. Based on commands input by the operator, money orders are automatically imprinted with the amount specified through control terminal 12 and dispensed to the operator. Printer 14 preferably contains a bar code reader, and the blank money order forms preferably are coded with bar code serial numbers. MICR technology may also be used for this purpose in a conventional manner. It will be apparent based on the present disclosure that any conventional OCR technology will also suffice.

1. Loading Procedure.

In order to permit the system to determine whether a blank document is at the beginning, middle or end of a pack or bundle, the blank documents are prepackaged in sets of a predetermined size (e.g., 400 documents) and given serial numbers commencing with a multiple of the pack size (e.g., 400, 800, 1200, etc.) The remaining documents are in serial order (e.g., 400–799 in one packet). The system can therefore easily determine the location of a particular document within a pack and how many documents remain in the pack.

Printer/vault 14 of MOD 10 is loaded with negotiable stock at the agent/user site. During loading, the terminal requests a security code. The user inputs a security code using control terminal 12, and the security code is verified to have access rights for the load function. If the current user has rights to the load function, control terminal 12 sends a signal to the printer/vault 14 to unlock the vault (preferably using a solenoid or conventional electro-mechanical lock) from the printer unit, allowing the user to remove the vault. Display 18 prompts the user to remove the vault. If the user fails to remove the vault within a pre-defined time, the printer unit will re-lock the vault. Access to the vault will not be granted without the re-entry of an authorized access code.

After the vault is removed from the printer unit, the user can load a pack of negotiable documents into the vault and re-attach the vault to the printer. After the vault is re-attached to the printer unit, control terminal 12 signals the printer to load the first form and perform a bar-code read on the pre-printed bar code on the form. The pre-printed bar code preferably comprises numeric and/or alpha characters. Upon reading the pre-printed bar code, the printer returns the numeric (or alpha, or alphanumeric) value to control terminal 12. Control terminal 12 determines whether the returned numeric value is appropriate and responds appropriately.

More explicitly, the steps are as follows. After control terminal 12 signals the printer to load a form and read the pre-printed bar code, the printer begins to load a form. If the leading edge of a document is not recognized, the printer will respond to control terminal 12 that no documents have been recognized. Control terminal 12 displays an error message that no documents were detected and requests the user to reload the forms.

When the leading edge of a document is recognized, the printer attempts to detect an under bar which indicates the position of the pre-printed bar code. If the under bar is not detected within a predetermined number of steps, the printer returns a message to control terminal 12 indicating that the under bar was not detected. The terminal displays an error message that there was a loading error and requests that the user reload the forms. In this manner, the terminal can detect whether the documents were loaded upside-down or backwards. Control terminal 12 signals the printer to return the form to the vault.

Once the under bar is detected, the printer attempts to read the pre-printed bar code on the form. If the bar code is read successfully, the printer returns the appropriate values to the terminal. The terminal calculates the number of items remaining in the pack, determines whether this load was of a full or partial pack; and verifies that the value is in the proper format. The terminal also verifies that the value passes all appropriate check digit verifications, displays a successful load message to the user, signals the printer to return the form to the vault, and makes appropriate entries in the journal (e.g., who opened the printer; time; whether a full pack or partial pack was loaded).

Whenever a document is read, control terminal 12 compares the current serial number to the expected serial number. If the current serial number is different than the expected serial number, the terminal determines if the current serial number is in the same pack as the expected serial number. If the current serial number is in the same pack as the expected serial number, the terminal records a missing serial number or range of serial numbers in its internal memory to indicate that items are missing from the pack. If the current serial number is not in the same pack as the expected serial number, the terminal records a missing range from the expected serial number to the end of the pack. The terminal then determines if there are missing items from the pack from the current serial number. If items are missing from the new pack to the current serial number, the terminal records a missing range of serial numbers from the beginning of the new pack to the current serial number.

The terminal also determines if the current serial number is the beginning of a pack, or if it is an item from the middle of a pack or if that serial number is already recorded in the journal. If the current item is the beginning of a new pack, the terminal records that a full pack has been loaded. If the current item is in the middle of a pack, the terminal records a partial pack has been loaded. If the serial number was previously recorded in the journal, the document is voided by printing "void" on the document. Again, this activity is entered into the journal.

The procedure for loading documents is described in more detail herein in connection with FIGS. 3(a)–3(d).

2. Issuance.

During the issuance of negotiable documents, control terminal 12 signals printer 14 to load a form. Printer 14 begins to load a form. If the leading edge of a document is not recognized within a predetermined number of steps within the printer, the printer responds to the terminal that no documents have been recognized. The terminal displays an error message that no documents were detected and requests that the user load new forms or reload the current set of forms. The terminal signals the printer to unload the form and return it to the vault.

Once the leading edge is recognized, the printer attempts to detect an under bar which indicates the position of the pre-printed bar code. If the under bar is not detected within a predetermined number of steps, the printer returns a message indicating to the terminal that the under bar was not detected. The terminal displays an error message that the under bar was not detected on the form and requests that the user reload the forms. The terminal signals the printer to return the form to the vault.

Once the under bar is detected, the printer advances a predetermined number of steps and attempts to read the pre-printed bar code on the form. If the bar code is read successfully, the printer returns the appropriate value to the terminal. The terminal verifies that the value is in the proper format and verifies that the value passes all appropriate check digit verifications. The terminal compares the current serial number to the expected serial number. If the current serial number is different than the expected serial number, the terminal determines whether the current serial number is in the same pack as the expected serial number. If the current serial number is in the same pack as the expected serial number, the terminal records a missing range from the expected serial number to the end of the pack. The terminal then determines if there are missing items from the pack from the current serial number. If items are missing from the new pack to the current serial number, the terminal records a missing range of serial numbers from the beginning of the new pack to the current serial number.

If the bar code is not successfully read within a predetermined number of retries, the printer returns an error message to the terminal indicating that the value could not be ascertained from the pre-printed bar code. The terminal displays an error message that the bar code is unreadable, then signals the printer to print void on the remainder of the item and records the expected serial number as a void. The terminal then signals the printer to load the next form and attempt the sale. This process continues until a readable form is recognized in the printer or until a pre-configured number of items has been voided due to unreadability.

When a readable form is recognized, control terminal 12 instructs the printer to print designated data on the document and make the appropriate journal entry. The MOD then dispenses the documents.

The procedure for issuing negotiable documents is described further herein in connection with FIGS. 4(a)–4(d).

3. Other Features.

The control terminal records a list of security codes and their associated rights in a memory. The control terminal allows a user to define each security profile with a unique set of configurable rights, increasing the flexibility of the security of the device. For example, certain operators may be allowed to perform all possible functions and others may be allowed to perform only a few functions, such as sales and voids.

In the case of a vendor payment, the money order is used to pay a vendor of the agent. This option is made available to some agents to permit them to allow employees to pay vendors without the need to maintain large amounts of cash on the premises. If an agent has been granted the optional vendor payment capability, the operator can, in many systems, enter any vendor name using the alphanumeric keypad. In other systems, the operator may be limited to selecting from a predetermined list of vendors. In such a system, a plurality of vendor names may be stored in the memory within the terminal for printing on the payee line of the negotiable documents.

Memory within control terminal 12 records a list of fees associated with ranges of dollar values. The user can configure the terminal to calculate a fee based on the amount requested or a percentage of the face amount. The terminal records four different ranges of values associated with a fee.

The reading of a specific pre-printed bar code for each item ensures the proper transaction posting of each sale item The missing item detection allows for a solid, traceable audit trail.

As described herein, the present invention utilizes software to unlock and lock the vault based on a pre-defined set of rules. For example, the vault may only be unlocked upon entry of an appropriate security code. The software monitors and relocks the vault if it has not been opened for a predetermined period of time. This software lock/unlock feature also helps to provide a traceable audit trail with respect to printer access. The flexible, completely configurable security parameters allow the user to define which rights are accessible by employees.

Software determines any break in sequence of the documents, registering these breaks as missing items. This is printed on all reports, which serves as an early warning notice for possible fraud.

The security code which allows access to sensitive areas of the application is dynamic. It changes daily based on a predetermined algorithm. The algorithm may be a function of the date, and/or a predetermined identification code. This prevents an agent from learning the code on one day while troubleshooting and re-using it at a later date.

Document Loading

The procedure for document loading with bar code logic is now described in connection with FIG. 3(a), FIG. 3(b), FIG. 3(c) and FIG. 3(d).

Initially, the system is in an idle mode, displaying the "status" or idle screen as shown in Step 100. In Step 102, the user enters a code (for example, function "9") to indicate that he or she wishes to load documents into the printer/vault. The system then displays "Enter User Code" in Step 104 and the user enters a user access code (single character or multi-character) in Step 106. In Step 108, the system determines whether the user has the rights to load documents (not all users will have such a right). If the user does not have such rights, the system will display "Access Denied" as shown in Step 110 and will return to the idle screen in Step 112. If, in Step 108, the system determines based on the access code that the user has the right to load documents, the document vault is unlocked in Step 114, and the system displays "Printer Unlocked, Remove M.O. Vault" in Step 116. The system also makes appropriate journal entries.

After displaying this message, a configurable timer is set (preferably five seconds), allowing the user to remove the vault, as indicated in Step 118. In Step 120, the system senses whether the vault has been removed during the predetermined time period. If not, the vault is re-locked to the printer, the system returns to Step 104, indicating in its display that the user should re-enter his or her user's code and try again. If the user removes the vault as shown in Step 122, the system displays "Load Money Orders and Replace Vault" in Step 124. In Step 126, the user loads documents and reattaches the vault. The system then checks in Steps 128 to determine whether an idle timer has expired or the user has pressed cancel. If so, the system returns to an idle screen. If not, the system determines whether the vault has been replaced and, if not, returns to Step 124 indicating on its display that the user should load money orders. If the vault has been replaced in Step 130, the system moves on through Node 132 (shown for convenience in both FIG. 3(a) and FIG. 3(b)) to Step 134.

In Step 134, the document is advanced under the print head and the bar code is read. If, in Step 136, the leading edge of the document has not been located, the system will display "Printer Error-Unreadable Bar Code" in Step 138, return the document to the vault in Step 140 (setting a vault empty flag), and return to the idle screen in Step 141.

If the leading edge of a document has been detected in Step 136, the system will determine in Step 142 whether the bar code underbar has been located and, if not, will display "Printer Error—Unreadable Bar Code" (or "U-Bar Undetected") in Step 144, thereafter moving on to Steps 140 and 141 as previously described. This detects documents that have been incorrectly positioned in the printer/vault (i.e., placed upside down or backwards).

If the underbar has been located in Step 142, the system will determine in Step 146 whether the bar code was successfully read. If not, the system will determine whether the bar code exceeded a configurable and predetermined retry limit in Step 148 and, if not, will return to Step 134. If so, the system will display "Printer Error—Unreadable Bar Code" in Step 150 and move on to Steps 140 and 141 as previously described.

If, in Step 146, the system determines that the bar code was read successfully, the system will check in Step 152 to determine whether the D.O. number matches a predetermined number. (The D.O. number is the first two numbers of the document serial number.) If not, the system in Step 154 will display "Printer Error—D.O. Does Not Match" and move on to Steps 140 and 141 as previously described. If the D.O. number does match the predetermined number in Step 152, the system will check in 156 to determine whether the check digit is correct and, if not, the system will display in Step 158 "Printer Error—Check Digit Incorrect" and move on to Steps 140 and 141 as previously described.

If the check digit in Step 156 is correct, the system will display "Documents Successfully Loaded" in Step 160, make sure that the vault flag is not set to empty in Step 162 and move on through Node 164 to Step 166.

In Step 166, the system determines whether the serial number of the document which last issued as a money order was the last item in the previous pack of documents. If so, the system determines in Step 176 whether the new document (i.e., the document just read after loading) is the first serial number in a pack. If so the system posts a "Full Pack Load" entry into its memory (also referred to as a journal) in Step 178 and returns to the idle screen in Step 180. If the current document is not the first serial number in a pack, the system posts a "Partial Pack Load" entry into the journal in Step 182 and moves on through Node 184 to Step 186.

If, in Step 166, the system determines that the last issued document was not the last item in the previous pack, the system checks its memory in Step 168 to determine whether there were any items missing from the previous pack and, if not, moves on to Step 176 previously described. If there were items missing from the previous pack, the system checks in Step 170 to determine whether there is more than one serial number missing from the previous pack. If not, the system posts in Step 172 a single item and moves on to Step 176 as previously described. If there is more than one serial number missing from the previous pack, the system posts, in Step 174, a missing range item showing the first and last serial numbers. After posting the missing range in Step 174, the system moves on to Step 176 as previously described. This missing range information is printed on all reports and can be transmitted to the host.

In Step 186, the system determines whether there are any serial numbers missing from the current pack. If not, the system returns to an idle screen in Step 188. If so, the system checks in Step 190 to determine whether there is more than one serial number missing from the current pack. If not, the system posts in Step 192 a single missing item with the serial number and moves on to Step 188 as previously described. If there is more than one serial number missing from the current pack, the system posts in Step 194 a missing range item showing the first and last serial numbers and moves on to Step 188 as previously described.

Sale or Vendor Payment

The sale or vendor payment with bar code logic is now described in connection with FIG. 4(a), FIG. 4(b), FIG. 4(c) and FIG. 4(d).

In Step 200, the system displays an idle screen. In Step 202, the user presses a function key indicating a "sale" or "vendor payment." In Step 204, the system displays "Enter User Code" and, in response, in Step 206, the user enters his or her user code. In Step 208, the system checks to determine whether the user has rights to perform a sale or vendor transaction and, if not, displays "Access Denied" in Step 210. The system subsequently returns to an idle screen in Step 212.

If, in Step 208, the system determines that the user does have a right to conduct a sale or vendor transaction, the system and user follow previously established functions to obtain information necessary to conduct the sale or vendor transaction, these procedures being performed in Step 214, after which the system moves through Node 216 to Step 218. In Step 218, a document is advanced to the printer. The system checks in Step 220 to determine whether the leading edge has been located. If not, in Step 222, the system unloads the document from under the print head and sets the vault empty flag, thereafter displaying in Step 224 "Printer Error—L. Edge, Please Check and Reload" and subsequently returns to the idle screen, Step 226. If the leading edge for the document is located in Step 220, the system checks in Step 228 to determine whether the underbar is located and, if not, unloads the document from under the print head in Step 230 and sets the vault empty flag. In Step 232, the system then displays "Printer Error—U. Bar, Please Check and Reload", and subsequently moves to Step 226 as previously described.

If, in Step 228, an underbar has been located, the system moves through Node 234 to Step 236.

In Step 236, the document is advanced under the print head and the bar code is read. If the system determines in Step 238 that the bar code was not read successfully, the system checks in Step 240 to determine whether the bar code exceeded configurable retry limit. If not, the system returns to Step 236. If so, the system displays in Step 242 "Unreadable, Voiding Item," prints "Void" on the document in Step 244, posts the voided document to a record in its memory (i.e., journal) in Step 246 and checks to determine whether a predetermined maximum number of unsuccessful reads has occurred in Step 248. If not, the system moves through Node 215 and 216 to Step 218. If so, the system displays in Step 252 "Unreadable Items, Please Check and Reload" or "Unreadable Items—Please Call the Help Desk" and in Step 254 sets MO vault empty flag, thereafter returning to the idle screen in Step 256.

If the bar code was read successfully in Step 238, the system moves through Node 251 to Step 258.

In Step 258, the system determines whether the D.O. number matches the predetermined value in the terminal. If not, the system displays in Step 260 "Printer Error—D.O. Does Not Match", unloads the document from under the print head and sets the vault empty flag in Step 262 and returns to the idle screen in Step 264. If the D.O. number does match the terminals in Step 258, the system determines in Step 266 whether the digit is correct and, if not, displays "Printer Error—Check Digit Incorrect" in Step 268 and moves on through Step 262 as previously described.

If the check digit is correct, the system determines in Step 270 whether the serial number is the next serial number expected and, if so, posts this document as a sale into the journal in Step 276, prints the remaining portion of the document in Step 280, and returns to the idle screen in Step 264.

If, in Step 270, the system determines that the serial number is not the next serial number expected, the system checks to see whether more than one serial number is missing in Step 272 and, if not, posts a single missing item with the serial number into the journal in Step 274 and moves on to Step 276 as previously described. If there is more than one serial number missing in Step 272, the system posts a missing range of items showing the first and last serial number into the journal in Step 278 and moves on to Step 276 as previously described.

Power Cycle

Figure 5:
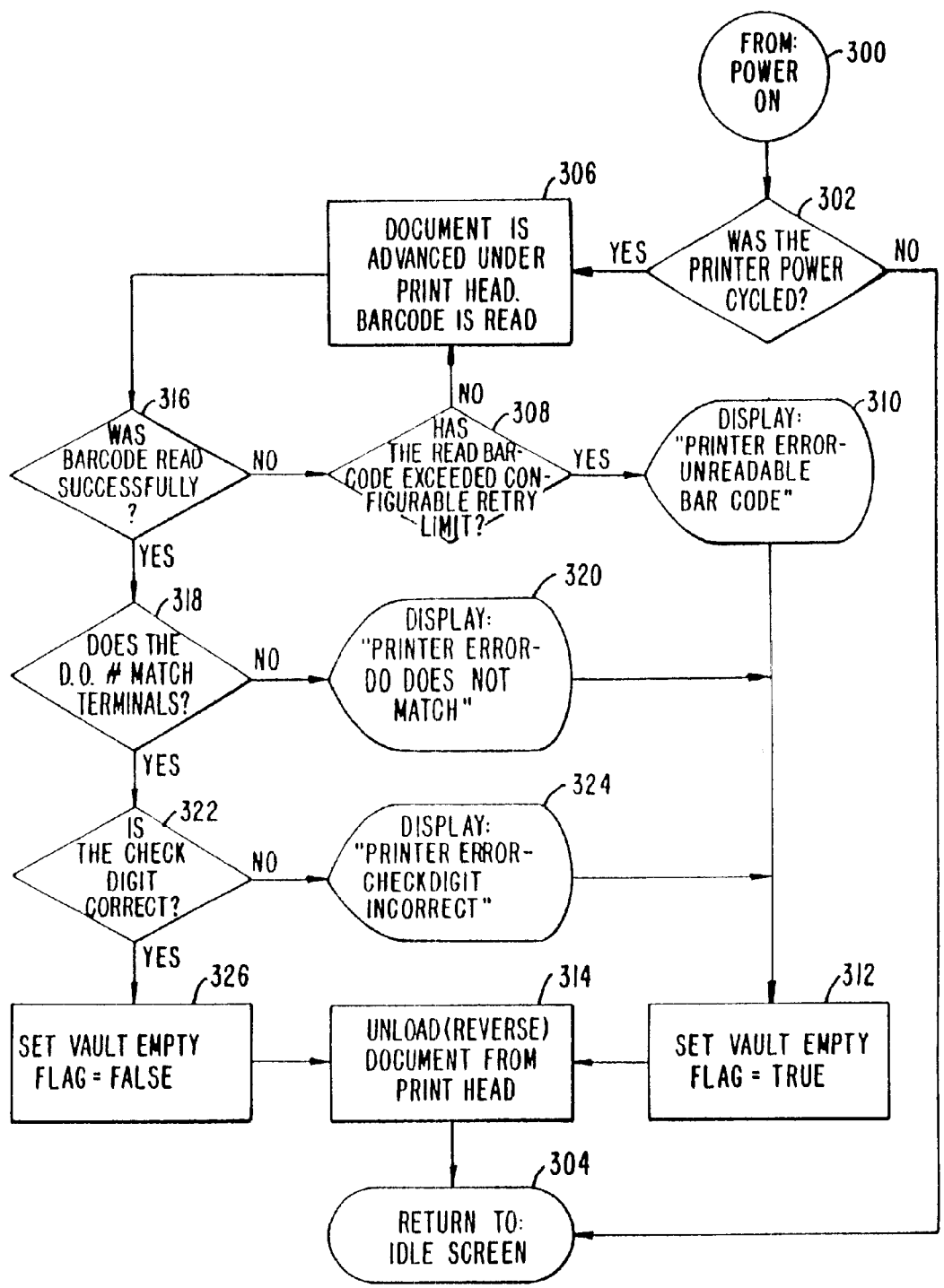
FIG. 5 is a flow chart showing an exemplary power cycle of a negotiable instrument dispenser according to the present invention.

The power cycle with bar code logic is now described in connection with FIG. 5.

In Step 300, the system is turned on. In Step 302, the system determines whether the printer power was cycled and, if not, returns to an idle screen in Step 304. If the printer power was cycled, a document is advanced under the print head in Step 306 and bar code is read. If the bar code is read successfully in Step 316, the system checks to determine whether the D.O. number matches the terminal's number in Step 318 and, if so, determines whether the check digit is correct in Step 322. If the check digit is correct, the system unsets the vault empty flag in Step 326, removes the document from under the print head (and optionally checks for missing items) in Step 314, and returns to the idle screen, making appropriate journal entries.

If the bar code was not read successfully in Step 316, the system checks in Step 308 to determine whether the bar code has exceeded the configurable retry limit and, if not, returns to Step 306. If so, the system displays in Step 310 "Printer Error—Unreadable Bar Code", sets the vault empty flag in Step 312, unloads the document from under the print head in Step 314, and returns to the idle screen in Step 304.

If, in Step 318, the D.O. number does not match the terminal's, the system displays in Step 320 "Printer Error—D.O. Does Not Match" and moves on to Step 312 as previously described.

If, in Step 322, the check digit is not correct, the system displays in Step 324 "Printer Error—Check Digit Incorrect" and moves on to Step 312 as previously described.

Download Notification and Call Back

The download notification and call back procedure is now described in connection with FIG. 6. In Step 400, the terminal transmits to the host system all of the data stored in its journal.

In Step 402, the host processes sales data on-line and, in Step 404, the host performs a match on device I.D. to a "Notification List". In Step 408, the host system determines whether the current device I.D. is on a "Notification List" and, if not, sends a predefined response in Step 410 and disconnects the call. If, in Step 408, the device I.D. is on the notification list, the system sends a predefined response in Step 412 with notification and disconnects the call. In Step 414, the terminal checks to determine whether the notification was for a scheduled or immediate callback. If the notification was for an immediate callback the system moves on to Step 420, which will be described hereafter. If the notification was for a scheduled callback, the terminal waits in an idle loop checking for the current time to equal the scheduled time in Step 416, and when the current time equals the scheduled time, moves on in Step 418 to Step 420.

In Step 420, the terminal determines whether the notification was for initialization, terminal application load or printer firmware load. If the notification was for a printer load, the terminal calls the host system in Step 422 to pull in a printer firmware enhancement and, after the download is complete, the disconnect is in Step 428.

If the terminal determines in Step 420 that the notification was for a program load, the terminal calls the host system in Step 424 and downloads a terminal software enhancement. After the download is complete, the call is disconnected in Step 428.

If the terminal determines in Step 420 that the notification was for initialization, the terminal calls the host system in Step 426 and downloads a terminal configuration modification, thereafter disconnecting the call in Step 428.

The notification can also be for multiple procedures (i. e., initialization and download). The notification may also be dependent on the unique code or version associated with each MOD, which is transmitted to the host system during the call.

In some embodiments, the host determines which devices to notify based on information received during a terminal diagnostic.

Software/Firmware Download Scheduling

In many embodiments of the present invention, the POS device communicates with the host at regularly scheduled intervals (for example, once-per-day at 11:30 p.m.). During such regularly scheduled communications, the terminal transmits data to the host and the host sends responses and instructions to the POS device ("terminal") as described above in connection with FIG. 6.

As described in connection with FIG. 6, the host may notify the POS device to call back immediately or at a scheduled date and time to receive a software download. Alternatively, the host may instruct the POS device to call back upon the occurrence of any specified set of conditions (e.g., when the device runs out of negotiable stock). For purposes of the above, firmware is considered a type of software.

Automatic Version Downloads

As indicated in FIG. 6, the notification may be dependent on the device I.D. Thus, the host computer may selectively notify devices based on the agent responsible for such devices (e.g., the responsible agent requests new features offered as an option by the owner). The download notification may also be contingent upon the version of software currently loaded onto the device (e.g., devices with software versions lower than 2.1 will be upgraded to version 3.0). The version currently located on a device may be determined in any manner, such as: (1) keeping a record of the versions loaded on each device at the host computer; (2) the host computer interrogating the device while they are in communication; or (3) the device automatically forwarding device I.D. information with related version information during each communication. Notification may also be dependent upon which products or services are offered by the POS device (e.g., only devices offering gift certificates receive downloads).

System Self-Check

In some embodiments of the present invention, the POS device performs a periodic self-check and sends a status report to the host computer. The scheduler of the self-check and/or status report preferably are alterable by the host computer.

Where the POS device is connected by a LAN to other devices, the POS device may also poll and check the status of other devices connected to the LAN (e.g., a PC, cash register, or gas pump).

The self-check can include checking any type of activity that may be monitored by the devices (e.g., how many paper jams, how many times was the printer vault opened, how many memory errors have occurred).

In some embodiments, the results of a self-check are periodically transmitted to the host.

Close-out Report Transmission

In certain embodiments in which the POS Device sells negotiable instruments, the device notifies the host automatically when it discovers a missing negotiable instrument. The POS Device may report single missing items or ranges of missing items, and may also report who opened the printer. Notification preferably occurs during a periodic transmission of data to the host.

Response Reconfiguration

In some embodiments, during a periodic transmission of data by a POS device to the host computer, the host computer may notify the device of a fee change or other change applicable to a product or service offered by the device. The device then implements the change by, for example, changing the fee amount stored in its memory. There is no need for the device to call back to the host computer in most such instances.

Configurable Security Lock-up

In certain embodiments, for security purposes, selected POS devices are programmed to "lock up" (i.e., cease to operate without an instruction from the host computer) if specified activities have not been performed within a specified time period. For example, if a close-out report has not been transmitted to the host computer in the previous twenty-four hours, the device will lock up. The set of activities that must occur to prevent a lock up are configurable based on the agent. Thus, the level of security may be configured on a device-by-device basis.

The present invention encompasses all subject matter within the scope of the claims. Accordingly, the present invention is not limited to the preferred embodiments described above.

The present invention is applicable to any type of POS device, such as devices used to sell money orders, gift certificates, gasoline, or other products. The present invention is also applicable to POS devices offering any service, such as bill payment or payroll payment services.

What is claimed is:

1. A system for managing distributed point-of-sale (POS) systems, comprising:

a central control system comprising one or more host computers;

a plurality of POS systems, each POS system comprising a POS device, a cash register, a personal computer, and an electronically controlled safe, said POS device, cash register, personal computer, and electronically controlled safe connected by a LAN, each POS system operating according to software loaded in its personal computer, each POS system having a port for communicating with said central control system;

wherein each POS device is a negotiable instrument dispenser, each personal computer is configured to transmit data to the central control system at pre-selected times and to receive response transmissions including instructions from the central control system;

wherein a given POS device verifies the pre-printed information on each negotiable instrument sold through it and records any break in the sequence of the negotiable instruments in a security journal; and wherein the given POS device alerts the central control system whenever there is a break in the sequence of the negotiable instruments, as an early alarm of possible fraud or theft.

2. The system of claim 1, wherein the instruction comprises contacting said host computer to receive a software download.

3. The system of claim 1, wherein the instruction comprises contacting said host computer upon occurrence of specified conditions.

4. The system of claim 3, wherein said specified conditions include a specified date and time.

5. The system of claim 1, wherein said POS device contacts said host computer at regularly scheduled intervals.

6. The system of claim 1, wherein the response transmission selectively notifies at least one of said POS devices that a software download is required.

7. The system of claim 6, wherein the host system determines which POS devices to notify based on the version of the software currently loaded in said POS devices.

8. The system of claim 6, wherein the host system determines which devices to notify based on an agent associated with the devices.

9. The system of claim 6, wherein the host system determines which devices to notify based on the type of product or service offered by the device.

10. The system of claim 6, wherein the host determines which devices to notify based on terminal diagnostic information.

11. The system of claim 1, wherein a POS device performs a self-check procedure and reports the results to the host computer.

12. The system of claim 1, wherein a POS device is connected to a LAN and performs a periodic status check of itself and another device connected to the LAN.

13. The system of claim 12, wherein the POS device further transmits the results of said status check to the host.

14. The system of claim 1, wherein the negotiable instrument dispenser notifies the host computer when there has been a missing document.

15. The system of claim 14, wherein the instruction comprises changing specified data stored in the negotiable instrument dispenser.

16. The system of claim 1, wherein the instruction comprises changing specified data stored in the POS device.

17. The system of claim 1, wherein a POS device is programmed to lock-up if said point-of-sale device cannot perform said instruction within a predetermined time period.

18. The system of claim 1, wherein a portion of the system is secured, entry of a security code permits access to said portion, and said security code changes periodically.

19. The system of claim 17, wherein said security code changes daily.

20. The system of claim 1, wherein said negotiable instrument dispenser comprises a money order dispensing machine.

21. The system of claim 1, wherein said pre-printed information comprises a serial number.

22. The system of claim 21, wherein said serial number is encoded.

23. The system of claim 22, wherein said serial number is encoded in a bar code format.

24. The system of claim 1, wherein said negotiable instrument comprises a money order form.

25. The system of claim 1, wherein said at least one of said POS devices comprises a control terminal.

26. The system of claim 25, wherein said control terminal verifies the pre-printed information on a negotiable instrument against a predetermined number provided by said control terminal.

* * * * *